United States Patent [19]

Londry

[11] Patent Number: 5,085,549

[45] Date of Patent: Feb. 4, 1992

[54] THREE-AXIS VARIABILITY COMPENSATING FASTENER

[75] Inventor: Kelly J. Londry, Ann Arbor, Mich.

[73] Assignee: Ford Motor Company, Dearborn, Mich.

[21] Appl. No.: 632,566

[22] Filed: Dec. 24, 1990

[51] Int. Cl.$^5$ .................. F16B 21/00; F16B 9/00
[52] U.S. Cl. .................. 411/339; 411/173; 411/177; 403/194; 403/195; 285/207
[58] Field of Search ............ 411/105, 108, 109, 112, 411/113, 173, 177, 178, 269, 338, 339, 324, 432, 433, 512, 265, 266; 285/206, 207, 217; 403/194–197, 239, 243

[56] References Cited

U.S. PATENT DOCUMENTS

| | | |
|---|---|---|
| 1,024,344 | 4/1912 | Langevin . |
| 1,182,288 | 5/1916 | Mack . |
| 1,461,210 | 7/1923 | Corley . |
| 1,611,302 | 12/1926 | Bourgon . |
| 1,717,389 | 6/1929 | Kipnis ........................... 285/207 |
| 1,797,194 | 3/1931 | Knapp . |
| 1,885,581 | 11/1932 | Bradbury ........................ 285/207 |
| 2,469,075 | 5/1949 | Paun . |
| 3,373,965 | 3/1968 | Bien et al. . |
| 3,525,190 | 8/1970 | Saunders et al. ............... 411/339 |
| 3,826,458 | 7/1974 | Fisher ............................ 411/173 |
| 4,406,176 | 9/1983 | Numazawa et al. . |
| 4,623,277 | 11/1986 | Wayne et al. . |
| 4,703,669 | 11/1987 | Hyodo . |

FOREIGN PATENT DOCUMENTS 1130876 10/1968 United Kingdom ............ 411/265

Primary Examiner—Neill R. Wilson
Attorney, Agent, or Firm—Daniel M. Stock; Roger L. May

[57] ABSTRACT

A mounting system for mounting components to panels includes a fastener assembly variable positioned in three axes and capable of being locked in position frictionally or mechanically in a final desired position by tightening a nut.

14 Claims, 1 Drawing Sheet

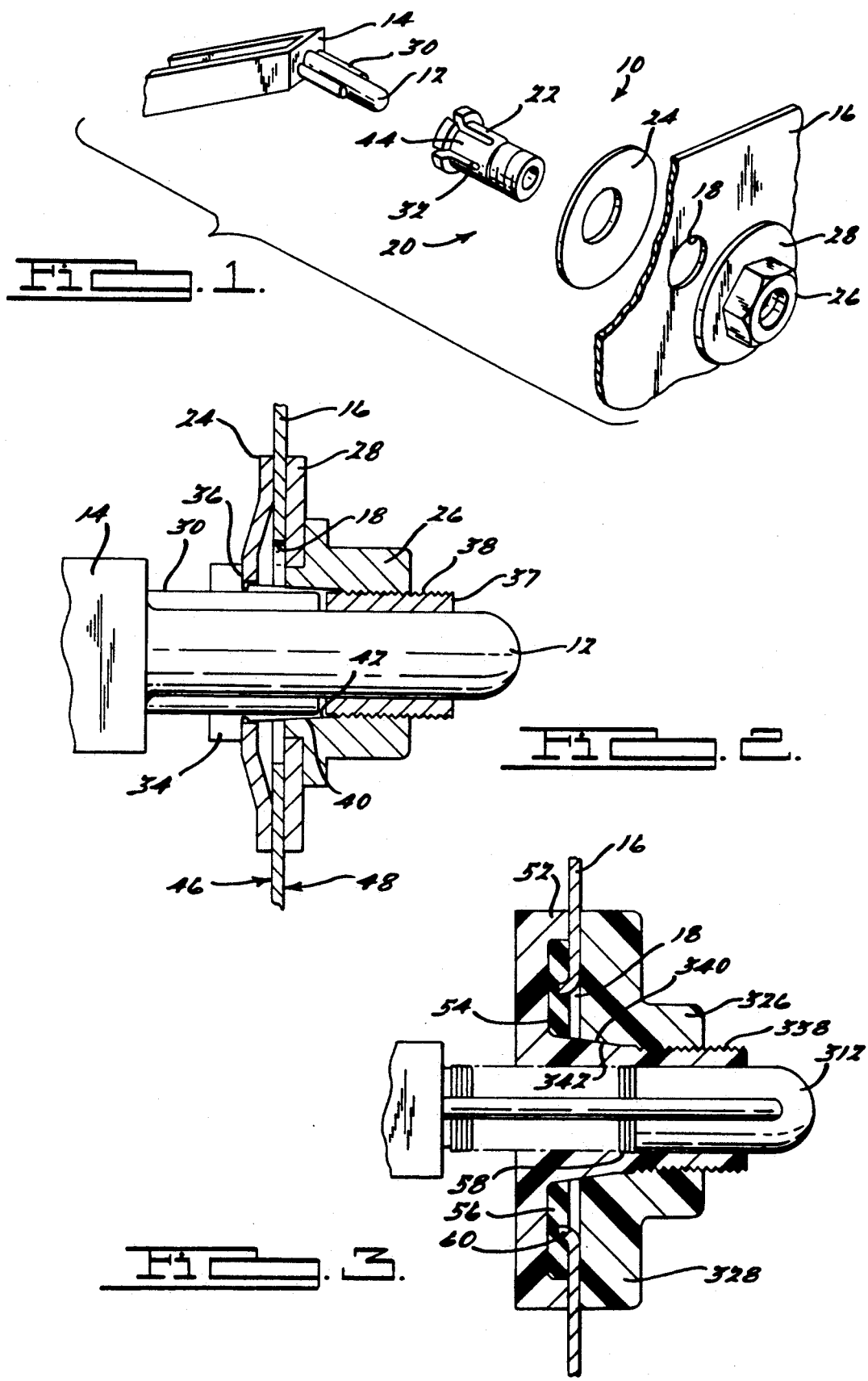

THREE-AXIS VARIABILITY COMPENSATING FASTENER

BACKGROUND OF THE INVENTION

1. Field of the Invention

The present invention relates generally to fasteners and more specifically to fastening systems accommodating a variability in fastening position.

2. Disclosure Information

In the automotive fastening arts, the wide variability in the positioning of structures to be fastened together necessitates the accommodation of a stack-up of tolerances between automotive body structure and the components that are assembled to an automotive body. One exemplary area is that of the fastening of steering column support bracketry to instrument panel structure. A very early example of such fastening is found in U.S. No. 1,611,302 to Bourgon which shows a rigid mounting technique used early in the industry. A modern approach is that illustrated in U.S. No. 3,373,965 to Bien et al. in which axial flexibility is given to the mounting of a clamp suspended with respect to a fixed bracket below an instrument panel.

The steering columns illustrated in these older patents and other automotive componentry generally uses brackets or other attaching devices which must be joined to a panel structure of the vehicle by insertion of some axial locking fastener through an aperture formed through the panel. None of the prior art devices have been found suitable for accommodating variability in positioning of the componentry in the panel with respect to the three mutually perpendicular axes of a Cartesian coordinate system.

SUMMARY OF THE INVENTION

Responsive to the deficiencies of the prior art in providing such three axis variability compensation and responsive to the industrial need to provide such compensation in a simple, effective and economic manner, the present invention provides a mounting system for securing a component to a panel which includes a stud carried with a component, a hole formed through the panel to permit insertion of the stud with diametrical clearance about the stud, and a fastener assembly that is both axially variable positionable with respect to the stud and carried within the diametrical clearance so that it can permit movement along axes perpendicular to the stud and provide for the clamping engagement with the panel to secure the stud and hence the component with respect to the panel in its final desired position.

It is an object of the present invention to provide such a system which can be assembled with tool axis at final assembly available on only one side of the panel.

It is another object of the present invention that the assembly be self-fixturing in defining its variably positioned assembled location.

BRIEF DESCRIPTION OF THE DRAWING

The efficacy of the mounting system of the present invention to provide the desired three-axis variability compensation in a simple, effective and economic manner will be appreciated by those skilled in the fastener arts by reading the following description with reference to the accompanying drawing in which;

FIG. 1 is an exploded view of a mounting assembly according to the present invention;

FIG. 2 is a cross-sectional view of the mounting assembly of FIG. 1 in its assembled condition; and FIG. 3 is a cross-sectional view similar to FIG. 2 in an alternative embodiment of the mounting system of the present invention.

DESCRIPTION OF THE PREFERRED EMBODIMENTS

Turning now to the drawings, and in particular to FIG. 1 thereof, a mounting assembly 10 according to the present invention is illustrated as comprising essentially an elongated stud 12 carried on a bracket 14 of a component, not shown, sought to be mounted, a panel 16 mounted, for example, in a vehicle in a conventional fashion having a hole 18 formed therethrough, and a fastener assembly indicated generally at 20. The fastener 20 is illustrated as comprising a collar 22, a conical spring lock washer 24, and a nut 26. A load distributing washer 28 is illustrated as being carried with the nut 26 and may be integrally formed therewith. The stud 12 is illustrated as an elongated member having radially extending splined projections 30. The collar 22 includes axially running slots 32 for receiving the splined projections and making the collar 22 rotatably fast with respect to the stud 12. An enlarged flanged portion 34 is formed on one end of the collar 22 for abutting engagement with a radially inner surface 36 of the conical spring washer 24.

The other end 36 of the collar 22 is externally threaded as indicated at 38 to threadedly receive the internally threaded nut 26. External and internal tapered surfaces 40, 42, respectively, of the collar 22 and nut 26, respectively, are arranged to wedgingly engage each other so that upon full threaded engagement of the nut 26 with respect to the collar 22, the portions 44 of the collar intermediate slots 32 are urged regularly inward toward locking engagement with respect to the stud, enhancing the frictional axial lock between the nut 26 and the collar 22. When the stud 22 is appropriately radially positioned within the diametrical clearance between the fastener assembly 20 and the hole 18 in the panel 16, clamping engagement is effected by urging the conical spring washer 24 against one side 46 of the panel 16 while the washer 28 of the nut 26 is urged against the other side 48. The washer 28 and the spring washer 24 are dimensioned to assure that a clamping preload is applied to the panel 16 before or simultaneously with the wedging engagement of surfaces 40, 42.

The alternative embodiment of FIG. 3 differs from that of FIGS. 1 and 2 in the respect that the nut 326 is formed of plastic and includes an integrally formed washer portion 328, and the hole 18 is extruded to form an axially running annular projection 50 while the collar 322 is reconfigured as a unitary molded plastic member to serve the function of both the collar 22 and the conical spring washer 24 by providing an annular stand-up flange portion 52 defining a pocket 54. The collar 322 is preferably molded to engage the splined projections 30 of the stud for anti-hold rotation and is radially split to deflect for locking engagement. An annular seal 56 is carried within the pocket 54, and is engaged by the projections 50 when the nut 326 is threadedly engaged over the threaded portion 338 of the collar 322 to the point at which tapered mating surfaces 340, 342 provide the radial compressive locking deflection.

In the case of the FIG. 3 embodiment, however, a mechanical axial lock is effected between the stud 312 and the collar 322 by providing a mating ribbed interface indicated at 58 between the stud 312 and internal surfaces of the collar 322 so that radial inner deflection effects axial locking. Variable positioning of the fastener in the other planes and securement is essentially identical to that of the FIGS. 1 and 2 embodiment except that the engagement of the panel projections 50 with the seal 26 affects radial mechanical locking.

It will be appreciated by those skilled in the fastener arts that the mounting system of the present invention allows the preassembly of the stud 12 with the collar 22 and spring washer 24 or with collar 322. Manual or robotic manipulation can then present the resulting subassembly to the apertured panel 16 where the nut 26, 28 or 326 may be drawn up tight from the other side of the panel for assembly. No significant load is imposed on the stud 12 or bracket 14 during this operation, which makes the fastening assembly self-fixturing.

While only two embodiments of the invention mounting assembly are here disclosed, others may be possible without departing from the scope of the appended claims.

I claim:

1. A mounting system for securing a component to a panel comprising:
   an elongated stud carried with the component;
   a hole formed through the panel being sized to permit insertion of the stud along its axis of elongation to provide substantial diametrical clearance therebetween; and
   a fastener assembly variably axially positionable along the stud axis of elongation, carried within the diametrical clearance and clampingly secured to the panel to provide variable positioning of the component with respect to three mutually perpendicular axes.

2. A mounting system as defined in claim 1, and further comprising:
   seal mean carried within the fastener assembly to seal the hole upon clamping engagement of the fastener assembly with respect to the panel.

3. A mounting system as defined in claim 1, wherein the fastener assembly comprises:
   an externally threaded collar received over the stud;
   resilient biasing means positioned axially intermediate one side of the panel and a potion of the collar; and
   an internally threaded fastener threadedly engageable with the collar and abuttingly engageable with the other side of the panel.

4. A mounting system as defined in claim 3, wherein the resilient biasing means comprises a conical spring washer.

5. A mounting system as defined in claim 3, wherein the internally threaded fastener comprises a nut formed of resilient plastic material and the radial biasing means comprises a circumferentially extending collar portion abuttingly engageable against the one side of the panel.

6. A mounting system as defined in claim 5, including means defining an annular pocket in the nut and the seal member received in the pocket.

7. A mounting system as defined in claim 6, wherein the hole is bounded by axially extending projection or engagement with the seal upon clamping engagement o the fastener assembly.

8. A mounting system as defined in claim 3, and further comprising:
   antiroatation means operatively disposed between the stud and the collar.

9. A mounting system as defined in claim 8, and further comprising means operative to lock the stud with respect to the collar in response to certain tightening movement between the collar and the internally threaded fastener.

10. A mounting system as defined in claim 8, wherein spline projection means are formed on the stud and the collar is formed as a split collar having axially running slot means for receiving the spline projection means thereby defining the antirotation means.

11. A mounting system as defined in claim 3, and further comprising means operative to lock the stud with respect to the collar in response to certain tightening movement between the collar and the internally threaded fastener.

12. A mounting system as defined in claim 11, wherein the means operative to lock comprises wedgingly engageable surfaces of the collar and the internally threaded fastener operative to radially deflect portions of the collar with respect to the stud.

13. A mounting system for securing a component to a panel comprising:
   an elongated stud carried with the component;
   a hole formed through the panel being sized to permit insertion of the stud along its axis of elongation to provide substantial clearance therebetween;
   a fastener assembly variably axially positionable along the stud axis of elongation, carried within the diametrical clearance and clampingly secured to the panel to provide variable positioning of the component with respect to three mutually perpendicular axes; and
   mechanically locking means operative to prevent radial movement of the fastener assembly with respect to the panel when the fastener assembly is clampingly engaged with the panel 14. A mounting system as defined in claim 13, wherein the fastener assembly comprises:
   an externally threaded collar received over the stud;
   resilient biasing means positioned axially intermediate one side of the panel and a portion of the collar;
   an internally threaded fastener threadedly engageable with the collar and abuttingly engageable with the other side of the panel; and
   mechanical locking means operatively disposed between the collar and the stud.

* * * * *